US011636745B2

(12) United States Patent
Candelore

(10) Patent No.: US 11,636,745 B2
(45) Date of Patent: Apr. 25, 2023

(54) DETECTION OF ANIMAL INTRUSIONS AND CONTROL OF A REPELLENT MECHANISM FOR DETECTED ANIMAL INTRUSIONS

(71) Applicant: SONY CORPORATION, Tokyo (JP)

(72) Inventor: Brant Candelore, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 499 days.

(21) Appl. No.: 16/798,653

(22) Filed: Feb. 24, 2020

(65) Prior Publication Data

US 2021/0259235 A1 Aug. 26, 2021

(51) Int. Cl.
| | | |
|---|---|---|
| *A01M 29/16* | (2011.01) | |
| *A01M 29/12* | (2011.01) | |
| *G06F 3/04847* | (2022.01) | |
| *A01M 31/00* | (2006.01) | |
| *G06V 10/25* | (2022.01) | |
| *G06V 40/10* | (2022.01) | |
| *G08B 13/196* | (2006.01) | |
| *G08B 15/02* | (2006.01) | |
| *H04N 7/18* | (2006.01) | |

(52) U.S. Cl.
CPC ....... *G08B 13/19652* (2013.01); *A01M 29/12* (2013.01); *A01M 29/16* (2013.01); *A01M 31/002* (2013.01); *G06F 3/04847* (2013.01); *G06V 10/25* (2022.01); *G06V 40/10* (2022.01); *G08B 13/19645* (2013.01); *G08B 15/02* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 6,700,486 B1* | 3/2004 | Banki | A01M 29/10 340/541 |
| 10,706,696 B1* | 7/2020 | Pachikov | B64C 39/024 |
| 10,888,085 B1* | 1/2021 | Monk | G06V 20/52 |
| 11,308,333 B1* | 4/2022 | Langford | G06V 20/52 |
| 2008/0048870 A1* | 2/2008 | Laitta | G08B 25/08 340/573.6 |
| 2008/0084787 A1* | 4/2008 | Graber | G08B 13/19641 367/96 |

(Continued)

FOREIGN PATENT DOCUMENTS

| | | |
|---|---|---|
| JP | 2017-148033 A | 8/2017 |
| KR | 10-2010-0084787 A | 7/2010 |

OTHER PUBLICATIONS

Iyapo, et al., "Design and Implementation of Motion Detection Alarm and Security System", International Journal of Applied Research, vol. 5, No. 1, Feb. 2017, pp. 33-42.

*Primary Examiner* — Ricky Chin
(74) *Attorney, Agent, or Firm* — Chip Law Group

(57) ABSTRACT

An electronic apparatus and a method are provided for detection of animal intrusions and control of a repellent mechanism to prevent such intrusions. The electronic apparatus controls an image-capture device to acquire an image of a house yard and selects a set of zones in the acquired image based on a user-specified setting. The electronic apparatus detects an animal in the acquired image and controls the repellent mechanism based on a determination that the detected animal is in a zone which is among the selected set of zones, to target the detected animal.

21 Claims, 8 Drawing Sheets

(56) References Cited

U.S. PATENT DOCUMENTS

| | | | |
|---|---|---|---|
| 2008/0259161 A1* | 10/2008 | Hellman | G08B 13/19695 348/148 |
| 2010/0201525 A1* | 8/2010 | Bahat | A01M 29/10 340/573.2 |
| 2011/0297090 A1 | 12/2011 | Chamberlain et al. | |
| 2013/0249218 A1* | 9/2013 | Vassilev | F03D 80/10 290/55 |
| 2014/0336263 A1* | 11/2014 | Krebs | A01M 31/002 514/688 |
| 2015/0264915 A1* | 9/2015 | Lee | A01M 29/10 116/22 A |
| 2016/0232777 A1* | 8/2016 | Jedwab | G08B 27/001 |
| 2019/0370552 A1* | 12/2019 | Nater | G06V 10/25 |
| 2020/0074210 A1* | 3/2020 | Beach | G06V 10/96 |
| 2021/0259235 A1* | 8/2021 | Candelore | G08B 15/02 |

* cited by examiner

DETECTION OF ANIMAL INTRUSIONS AND CONTROL OF A REPELLENT MECHANISM FOR DETECTED ANIMAL INTRUSIONS

CROSS-REFERENCE TO RELATED APPLICATIONS/INCORPORATION BY REFERENCE

None.

FIELD

Various embodiments of the disclosure relate to application of computer vision in home security solutions. More specifically, various embodiments of the disclosure relate to an electronic apparatus and method for detection of animal intrusions and control of a repellent mechanism for such detected animal intrusions.

BACKGROUND

With deforestation and wildfires, animals are forced to leave their natural habitats in search of food and shelter. When they enter in residential areas, they can wound or kill pets and harm people. Fences are no deterrent. Coyotes, for example, can jump up over 6-foot barriers and even pass through railings. Birds of prey can also be a problem. Hawks, howls and even crows have been known to attack pets in a back-yard. The presence of such animals in the residential areas creates a sense of fear and is a heart-felt security issue.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for detection of animal intrusions and control of repellent mechanism for such detected intrusions is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic apparatus and method for repellent mechanism for animal intrusion in set zones of a house yard. Exemplary aspects of the disclosure provide an electronic apparatus that may be configured to control an image-capture device (for example, a camera) to acquire an image. The acquired image may be of a house yard (for example, a front yard or a back yard of a house). The electronic apparatus may be further configured to select a set of zones of the house yard in the acquired image based on a user-specified setting that includes a historical user selection of the set of zones to be protected from intrusion of an animal (for example, a coyote, a deer, or hawk). The electronic apparatus may be further configured to detect the animal in the acquired image and control a repellent mechanism based on a determination that detected animal is in a zone of the selected set of zones, to target the detected animal in the zone of the house yard.

In some conventional solutions, a motion sensor is used to detect an animal in the vicinity of the house yard. The motion sensor may detect presence of an animal or other moving objects in the house yard but may not be able to differentiate a wild animal from a pet animal or a human. And so, while the motion sensor is in effect, the yard may be off limits to a pet animal or a human. Also, repellent mechanisms of such conventional solutions may not be able to target the wild animal at the location/position of the animal in the house yard. For example, when activated, a water sprinkler-based repellent mechanism may typically spray water within a set radius of the house yard. In case the animal is outside the set radius, the animal may have little to no impact of the water-sprinkler based repellent mechanism. In comparison to such conventional solutions, the disclosed electronic apparatus may be able to create a plurality of zones in the house yard and provide the user with ability to select, from the plurality of zones, a set of zones in which the repellent mechanism should be triggered based on the detection of the animal in one of the selected set of zones. As the animal is first detected in a zone before the repellent mechanism is activated for the zone, the disclosed electronic apparatus may be controlled to minimize any possible collateral damage to property that may be around the house.

In many conventional approaches, a single universal deterrence strategy (for example sounding an alarm) is selected for every type of animal. This strategy may be inefficient as all the animals may be not be afraid of sounds (alarm sounds). In comparison to conventional approaches, the electronic apparatus may determine the type of the detected animal and select a deterrence strategy for the detected animal based on the type of animal.

Figure 1:
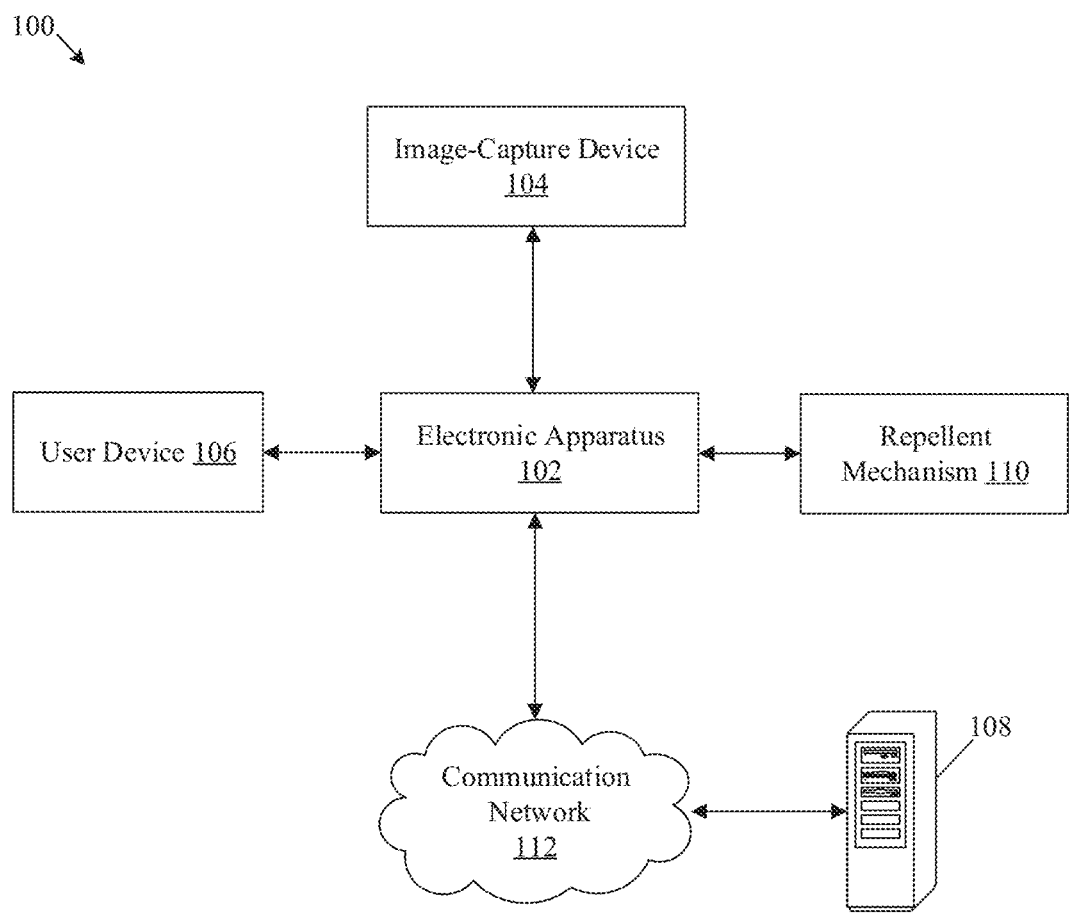
FIG. 1 is a diagram that illustrates an exemplary environment for detection of animal intrusions in a house yard and control of a repellent mechanism for such detected intrusions, in accordance with an embodiment of the disclosure.

FIG. 1 is a diagram that illustrates an exemplary environment for detection of animal intrusions in a house yard and control of a repellent mechanism for such detected intrusions, in accordance with an embodiment of the disclosure. With reference to FIG. 1, there is shown a network environment 100. The network environment 100 includes an electronic apparatus 102, an image-capture device 104, a user device 106, a server 108, a repellent mechanism 110, and a communication network 112. The electronic apparatus 102 may be communicatively coupled to the image-capture device 104, the user device 106, and the server 108, via the communication network 112.

In FIG. 1, the electronic apparatus 102 and the image-capture device 104 are shown as two separate devices; however, in some embodiments, the entire functionality of the image-capture device 104 may be included in the electronic apparatus 102, without a deviation from the scope of the disclosure.

The electronic apparatus 102 may include suitable logic, circuitry, and interfaces that may be configured to acquire an image of the house yard from the image-capture device 104 and detect an animal in the acquired image. The electronic apparatus 102 may be further configured to control the repellent mechanism 110 based on a detection of the presence of the animal in the acquired image. The repellent mechanism 110 may be controlled to target the detected animal present in the house yard. Examples of the electronic apparatus 102 may include, but are not limited to, a server, a smart doorbell, a smart irrigation system, a security camera, a surveillance system, a pest repellent, a computing device with image processing capability and with a capability to actuate one or more repellent mechanism(s) that rely on chemical repellents, sound or alarms, water spray, flashing lights, stink bombs, and the like.

The image-capture device 104 may include suitable logic, circuitry, and interfaces that may be configured to acquire images (including a preview image) of the house yard. The preview image may be utilized in the initial setup phase of the electronic apparatus 102 and other images may be acquired during the operational mode of the electronic apparatus 102. Example implementations of the image-capture device 104 may include, but are not limited to a semiconductor charged coupled device (CCD) based image sensor, a complementary metal-oxide-semiconductor (CMOS) based image sensor such as the Sony EXMOR™, a backlit CMOS sensor with global shutter, a depth sensor, a 3D imaging sensor, a silicon-on-insulator (SOI)-based single-chip image sensor, an N-type metal-oxide-semiconductor based image sensor, a flat panel detector, or other image sensors. In some embodiments, the image-capture device 104 may be integrated within the electronic apparatus 102. In other embodiments, the image-capture device 104 may be a separate entity from the electronic apparatus 102. For example, while the electronic apparatus 102 may be implemented as a cloud server, the image-capture device 104 may be implemented as a security camera installed to have the house yard in its field of view. In such cases, the image-capture device 104 may be configured to communicate with the electronic apparatus 102, via the communication network 112.

The user device 106 may include suitable logic, circuitry, and interfaces that may be configured to display a preview image acquired by the image-capture device 104. The user device 106 may receive a user input for a selection of a set of zones in the acquired previewed image to be protected from animal intrusions. Examples of the user device 106 may include, but are not limited to, a tablet, a computing device, a smartphone, a cellular phone, a mobile phone, a gaming device, a mainframe machine, a server, a computer workstation, and/or a consumer electronic (CE) device.

In some embodiments, the functionality of the user device 106 may be included at least partially or in its entirety in the electronic apparatus 102. For example, the electronic apparatus 102 may be implemented as a smartphone. The smartphone may allow the user to view the preview image of the house yard and to select a set of zones from acquired preview images. In some other embodiments, the user device 106 may be integrated with the electronic apparatus 102. In such an implementation, the electronic apparatus 102 and the user device 106 may be implemented as a display panel that may be installed inside the house to display images acquired by the image-capture device 104 and to update a user-specified setting for selection of the set of zones to be protected from an animal intrusion.

The server 108 may include suitable logic, circuitry, and interfaces that may be configured to store a user-specified setting which may include a historical user selection of the set of zones to be protected from an animal intrusion. Additionally, in some embodiments, the server 108 may store the acquired image, the acquired preview image, or a set of deterrence strategies to prevent the animal intrusion in the house yard. The server 108 may be implemented as a cloud server which may execute operations through web applications, cloud applications, HTTP requests, repository operations, file transfer, and the like. Other examples of the server 108 may include, but are not limited to a database server, a file server, a web server, a media server, an application server, a mainframe server, a cloud server, or other types of servers. In one or more embodiments, the server 108 may be implemented as a plurality of distributed cloud-based resources by use of several technologies that are well known to those skilled in the art. A person with ordinary skill in the art will understand that the scope of the disclosure may not be limited to implementation of the server 108 and the electronic apparatus 102 as separate entities. In certain embodiments, the functionalities of the server 108 may be incorporated in its entirety or at least partially in the electronic apparatus 102, without departure from the scope of the disclosure.

The repellent mechanism 110 may include suitable logic, circuitry, interfaces, and/or mechanical implements to target animal(s) detected in one of the set of zones (specified by the user) of the house yard. The repellent mechanism 110 may include, for example, a water spray, a water jet, an alarm, a stink bomb, a chemical repellent spray, a barricade setup, a light flash strategy, and the like. In some embodiments, the repellent mechanism 110 may also include an electronically-controlled actuator to execute a specific repellent action (i.e. a deterrence strategy) of the repellent mechanism 110. Examples of the electronically-controlled actuator may include, but are not limited to, an electronically-actuated pump for a water spray or a water jet, an electronically-actuated thrower to throw the stink bomb, or a linear actuator to extend the barricade setup as a fence in the house yard. The repellent mechanism 110 may also include other suitable components or systems, in addition to the components or systems illustrated herein to describe and may explain the function and operation of the present disclosure. A description of such components or systems is omitted herein for the sake of brevity.

The communication network 112 may include a communication medium through which the electronic apparatus 102, the image-capture device 104, the user device 106 and the server 108 may communicate with each other. The communication network 112 may be a wired or wireless communication network. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the repellent mechanism 110 may be installed in the house yard to prevent animal intrusions or to protect the house yard (including human or other pet animals) from the animal intrusions. The repellent mechanism 110 may be controlled by the electronic apparatus 102. In initial setup/initiation phase, the electronic apparatus 102 may control the image-capture device 104 to acquire the preview image of a field-of-view (FoV) region which may include at least a portion of the house yard. The house yard may include the front yard, the back yard, or both the front yard and the backyard of the house.

In some embodiments, the image-capture device 104 may be installed in such a position that the FoV region of the image-capture device 104 may cover a wide view of the house yard. For example, the image-capture device 104 may be installed on the main entrance of the house or in the balcony of the house so that it may cover the wider view. In some other embodiments, a plurality of image-capture devices may be installed around the property associated with the house so as to cover the entire area of the house yard.

The electronic apparatus 102 may control the user device 106 to display the acquired preview image. The acquired preview image (or images) may show different parts of the house yard such as garage, driveway, or lawn. To help the user to decide which parts of the house yard should be protected from the animal intrusion, the electronic apparatus 102 may determine a plurality of zones of the house yard in the acquired preview image. From such zones, the user may be able to select zones where the repellent mechanism 110 may be activated or where the repellent mechanism 110 may not be activated. In at least one embodiment, the electronic apparatus 102 may implement semantic segmentation on the acquired preview image to generate a plurality of segmented parts, each of which may be tagged as a zone of the plurality of zones. By way of example, and not limitation, a first zone of the plurality of zones may be associated with a lawn area, a second zone of the plurality of zones may be associated with the garage, a third zone of the plurality of zones may be associated with the driveway, and a fourth zone of the plurality of zones may be associated with pathway.

In an embodiment, the electronic apparatus 102 may control the user device 106 to display a plurality of user-selectable options onto the displayed preview image. Each of the plurality of user-selectable options may correspond to at least one of the determined plurality of zones. The electronic apparatus 102 may receive a user input over the displayed plurality of user-selectable options via the user device 106. Based on the received user input, the electronic apparatus 102 may select a set of zones that may need to be protected from animal intrusion. The set of zones may be selected from the determined plurality of zones. Such selection of the set of zones may be stored as a user-specified setting on the electronic apparatus 102 or on the server 108. In some embodiments, the set of zones may be selected without any human input, based on predetermined information associated with zones where animal intrusion is historically observed (and/or statistically estimated) to be most likely to occur. By way of example, the selected set of zones may include the first zone that may correspond to a lawn area and the second zone that may correspond to the garage. The initiation phase may be completed after the selection of the set of zones from the plurality of zones.

After the initiation phase, the electronic apparatus 102 may enter an operational phase. In the operational phase, the electronic apparatus 102 may control the image-capture device 104 to acquire an image that may include the house yard. In some embodiments, before the acquisition of the image, the electronic apparatus 102 may detect presence of an animal in the house yard or in the vicinity of the house yard. For example, a wild animal may be detected based on an increase in loudness of footsteps in the direction of the lawn. The presence may be detected via a motion sensor embedded or installed in the electronic apparatus 102. Alternatively, a set of motion sensors may be installed at different positions in the house yard, depending upon the size of the house yard. In such a case, the image may be acquired based on the detected presence of the animal. Examples of such types of motion sensors may include, but not limited to, Passive Infrared (PIR) sensors, ultrasonic sensors, microwave sensors, and tomographic sensors. Additionally, or alternatively, it may also be possible to use a camera/image sensor, such as Sony's XMOR CMOS camera sensor, to detect movement and the presence of the animal.

The electronic apparatus 102 may select the set of zones of the house yard in the acquired image based on the user-specified setting (as created in the initiation phase). The user-specified setting may include a historical user selection of the set of zones to be protected from the animal intrusion. Thereafter, the electronic apparatus 102 may detect the animal in the acquired image. The electronic apparatus 102 may also determine the type of the detected animal. The type of the detected animal may correspond to a class (for example, a wild animal, a domesticated breed of animal, or the user's pet animal) to which the detected animal may belong to. The type of the detected animal may be determined based on animal characteristics, such as, but not limited to, the color of the animal, the size, the speed, or other body features.

The electronic apparatus 102 may classify the detected animal as one of a pet animal or a wild animal based on the animal characteristics of the detected animal. Additionally, in some embodiments, the electronic apparatus 102 may also classify the detected animal as a human (or specifically, a resident of the house). In case the detected animal is classified as the pet animal (or as one of the domesticated breed of animal) or a human, the electronic apparatus 102 may not activate the repellent mechanism 110 until a new animal is detected, or new motion signals are received. In case the detected animal is classified as a wild animal, the electronic apparatus 102 may determine whether the detected animal is in one of the selected set of zones, i.e. the first zone (lawn area) or the second zone (the garage). Based on a determination that the detected animal is present in one of the first zone or in the second zone, the electronic apparatus 102 may control the repellent mechanism 110 to target the detected animal in the zone of the house yard. Herein, the act to target the detected animal in the zone may correspond to an act to scare away the detected animal or to prevent further intrusion (and activities (e.g., damage to property (includes lawn or other valuable assets))) of the detected animal. Such an act may include activation of an alarm sound, a water spray, or a light flash, for example. In cases where the detected animal attacks or poses danger to a pet animal or a human, the act to target the detected animal may correspond to the use of offensive strategies, where the detected animal may be targeted with deterrents, such as stink bombs, light flashes, an alarm sound, pressurized water jet, or chemical repellents.

In at least one embodiment, the electronic apparatus 102 may share a notification with the user device 106 based on the detection of the animal in the acquired image. The notification may include the acquired image and may prompt a plurality of options and wait for a user's response. For example, the plurality of options may include an option to activate the repellent mechanism 110 and another option to call a wildlife removal service. In such a case, the user response may correspond to a control of the repellent mechanism 110 to target the detected animal in the zone of the house yard. Optionally, the user response may include a call to the wildlife removal service, an animal welfare, or a rescue group to securely capture and remove the animal from the house yard in a humane manner.

In some embodiments, the electronic apparatus 102 may detect that the animal may be approaching the house yard or one of the selected set of zones in the house yard. Through a barricade setup as the repellent mechanism 110, the electronic apparatus 102 may prevent the animal from entering the house yard via one of the selected set of zones. The barricade setup may be initially installed in a compacted configuration around the house yard (e.g., as an extendable fence around the property) or around the set of zones in the house yard. The electronic apparatus 102 may set the barricade setup to an uncompacted configuration to prevent the animal intrusion in the set of zones. Additionally, in at least one embodiment, the electronic apparatus 102 may adjust a z-height of the barricade setup based on a height of the detected animal. As an example, if the detected animal is a rabbit, the electronic apparatus 102 may adjust the height of the barricade setup to about 2 feet or less. As another example, if the detected animal is a coyote, the electronic apparatus 102 may adjust the height of the barricade setup to 8 feet as the coyote may not be able to make a jump for 6 feet or more.

Modifications, additions, or omissions may be made to FIG. 1 without departing from the scope of the present disclosure. For example, the network environment 100 may include more or fewer elements than those illustrated and described in the present disclosure.

Figure 2:
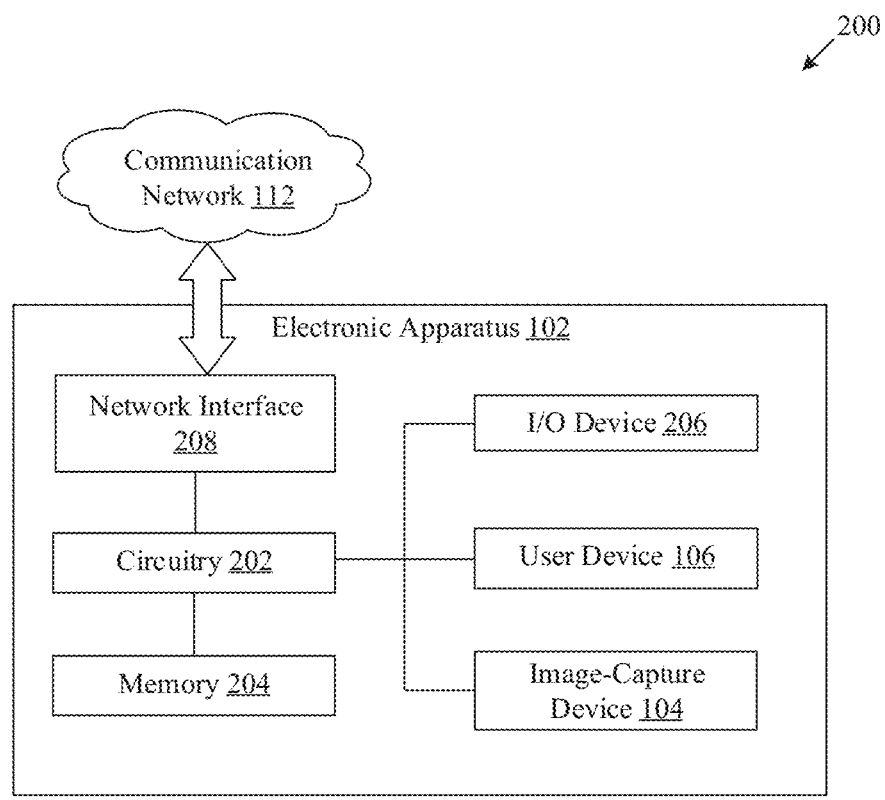
FIG. 2 is a block diagram that illustrates an exemplary electronic apparatus for detection of animal intrusions in a house yard and control of a repellent mechanism for such detected intrusions, in accordance with an embodiment of the disclosure.

FIG. 2 is a block diagram that illustrates an exemplary electronic apparatus for detection of animal intrusions in a house yard and control of a repellent mechanism for such detected intrusions, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202 which may perform operations for control of the repellent mechanism 110 to control intrusion of an animal in a house yard. The electronic apparatus 102 may further include a memory 204, an input/output (I/O) device 206, and a network interface 208. In at least one embodiment, the electronic apparatus 102 may include the image-capture device 104 and the user device 106. The circuitry 202 may be communicatively coupled to the memory 204, the I/O device 206, the network interface 208, the image-capture device 104, and the user device 106.

The circuitry 202 may include suitable logic, circuitry, and interfaces that may be configured to execute program instructions associated with different operations to be executed by the electronic apparatus 102. The circuitry 202 may include one or more specialized processing units, which may be implemented as a separate processor, an integrated processor, or a cluster of processors that perform the functions of the one or more specialized processing units, collectively. The circuitry 202 may be implemented based on a number of processor technologies known in the art. Examples of implementations of the circuitry 202 may be an x86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a Graphics Processing Unit (GPU), and/or other control circuits.

The memory 204 may include suitable logic, circuitry, and interfaces that may be configured to store the instructions to be executed by the circuitry 202. The memory 204 may further store the acquired image(s) and the user-specified setting for the selection of the selected set of zones in the acquired image. The memory 204 may also store a set of deterrence strategies for each type of animal. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 which may include various input and output devices, may be configured to communicate with the circuitry 202. Examples of the I/O device 206 may include, but are not limited to, the user device 106, a touch screen, a keyboard, a mouse, a joystick, a microphone, a display device, and a speaker.

The network interface 208 may include suitable logic, circuitry, and interfaces that may be configured to facilitate communication between the circuitry 202 and the server 108, via the communication network 112. The network interface 208 may be implemented by use of various known technologies to support wired or wireless communication of the electronic apparatus 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wired or wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic apparatus 102, as described in FIG. 1, may be performed by the circuitry 202. Operations executed by the circuitry 202 are described in detail, for example, in FIG. 3, FIG. 4, FIG. 5, and FIG. 6.

Figure 3:
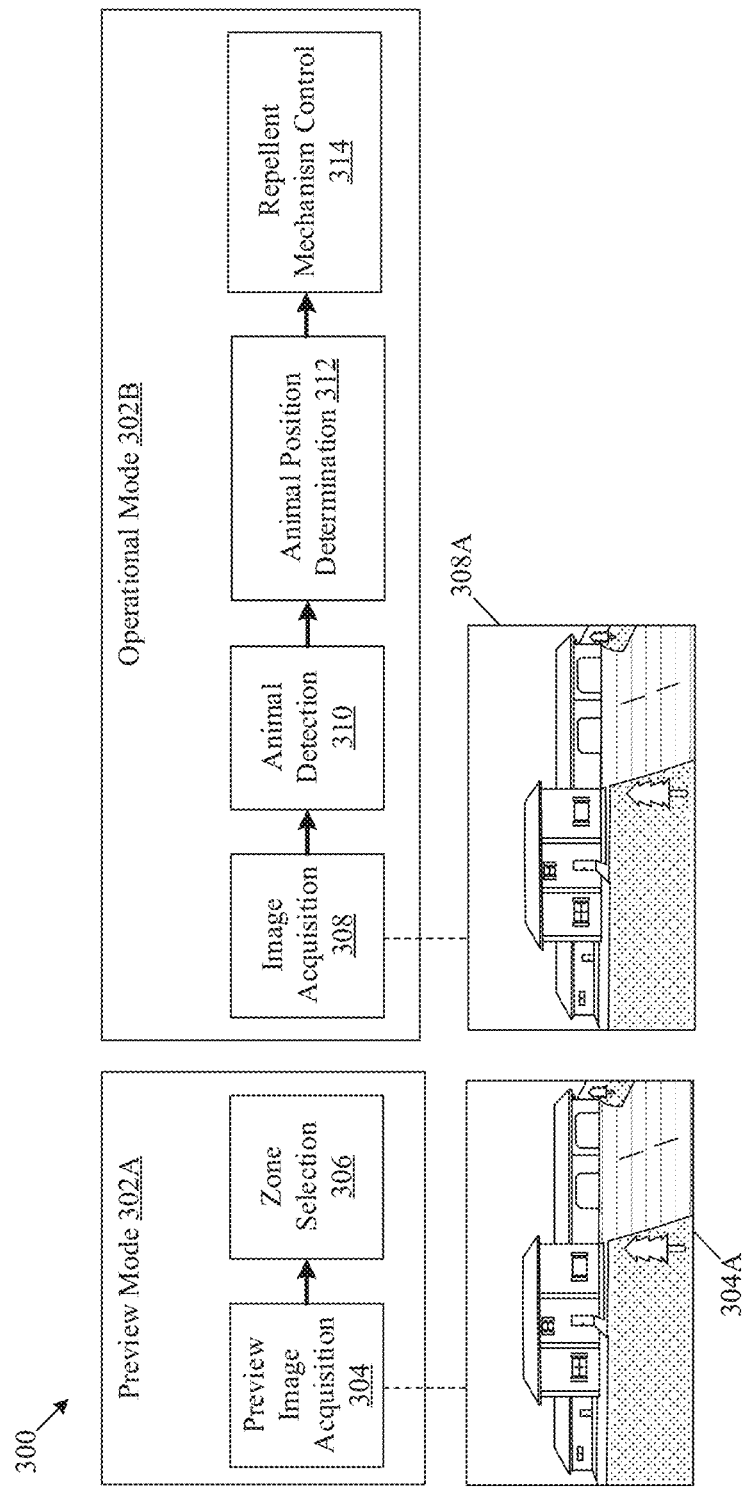
FIG. 3 is a diagram that illustrates exemplary operations for detection of animal intrusions in a house yard and control of a repellent mechanism for such detected intrusions, in accordance with an embodiment of the disclosure.

FIG. 3 is a diagram that illustrates exemplary operations for detection of animal intrusions in a house yard and control of a repellent mechanism for such detected intrusions, in accordance with an embodiment of the disclosure. FIG. 3 is explained in conjunction with elements from FIG. 1 and FIG. 2. With reference to FIG. 3, there is shown a block diagram 300 that illustrates exemplary operations from 304 to 314. The exemplary operations may be categorized under a preview mode 302A and an operational mode 302B. The preview mode 302A may include operations from 304 to 306 as part of a setup phase for the electronic apparatus 102. The setup phase may be required to update an initial setting (a user-specified setting) for the electronic apparatus 102 and may be a onetime operation to setup the electronic apparatus 102 before the electronic apparatus 102 transitions to the operational mode 302B. After the preview mode 302A, the circuitry 202 may transition to operations from 308 to 316, as part of the operational mode 302B.

At 304, a preview image 304A may be acquired. The circuitry 202 may control the image-capture device 104 to acquire the preview image 304A of a house yard. The house yard may be in the FoV region of the image-capture device 104 and may include a front yard or a back yard of a house. An example of the preview image 304A of the front yard is provided in FIG. 4. The circuitry 202 may control the user device 106 to display the acquired preview image 304A on a display screen of the user device 106.

In an embodiment, the circuitry 202 may determine a plurality of zones of the house yard in the acquired image 308A by techniques, such as, but not limited to, semantic segmentation or object classification using neural networks. The determined plurality of zones may include, for example, a driveway, a garage, a lawn, a porch, a garden as part of the backyard, and the like. In contrast to conventional approaches where users may not be able to decide which areas should be monitored for animal intrusion, the present disclosure provides an approach where the user may be able to select multiple zones to control where the repellent mechanism 110 could be activated upon detection of an animal intrusion, as described herein.

Figure 4:
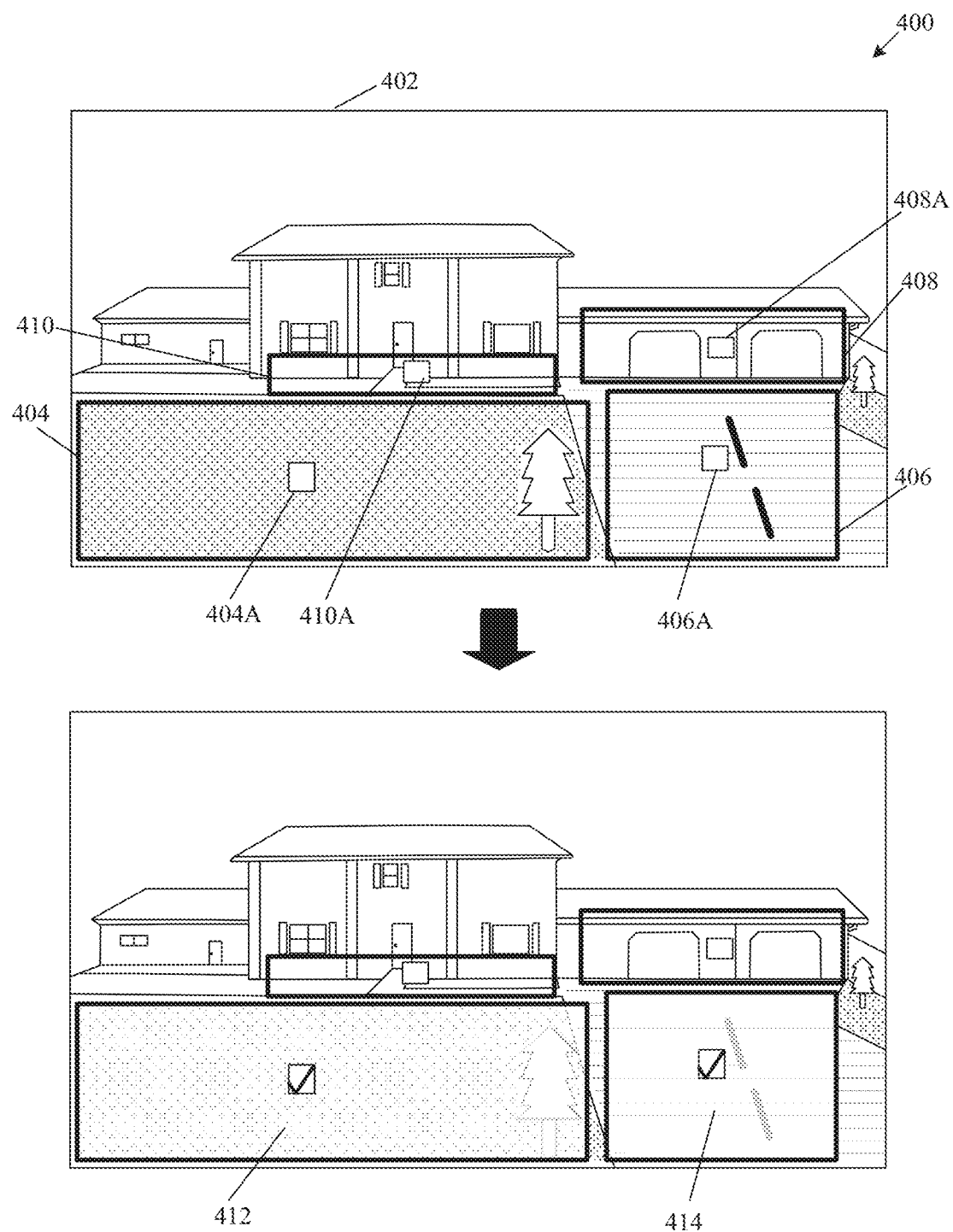
FIG. 4 is a diagram that depicts an exemplary scenario for selection of a set of zones to be protected from animal intrusions, in accordance with an embodiment of the disclosure.

At 306, zones may be selected. For such selection, the circuitry 202 may control the user device 106 to display, onto the displayed preview image 304A, a plurality of user-selectable options for the determined plurality of zones. An example of the plurality of user-selectable options is shown in FIG. 4. The circuitry 202 may receive, via the user device 106, a user input over the displayed plurality of user-selectable options. For example, if user-selectable options are rendered as checkboxes over rectangular bounding boxes around zones identified in the preview image 304A, the user input may include a selection of one or more checkboxes to indicate a selection of respective zones. Based on the user input, the circuitry 202 may select, from the determined plurality of zones, a set of zones to be protected from the animal intrusion. The user may select one or more of the set plurality of user-selectable options to specify the set of zones, where if an animal is detected, the circuitry 202 may activate the repellent mechanism 110 to target the animal. For unselected zones, i.e. zones for which respective user-selectable options remain unselected, the repellent mechanism 110 may be remain deactivated. Once the selection is made, the circuitry 202 may store the selection of the set of zones as a user-specified setting in the memory 204.

In some cases, the selection of the set of zones may be affected by a human bias. For example, the user may not select the garage zone as the user may not want the repellent mechanism 110 to target the garage zone to prevent any collateral damage to the user's car (parked near the garage door). In such cases, even if the animal intrudes in the garage zone, the repellent mechanism 110 may not be activated to target any intrusions in the garage zone. In order to avoid such instances, the circuitry 202 may be able to provide recommendation(s) to the user for selection of zones or may automatically select the zones. For such an implementation, the circuitry 202 may generate a heatmap of the determined plurality of zones in the acquired preview image 304A. The heatmap may indicate a frequency of historical animal intrusions in each zone of the determined plurality of zones. The circuitry 202 may control the user device 106 to display a user-selectable recommendation that may include the set of zones that should be protected from the animal intrusion based on the generated heatmap. The user-selectable recommendation may help the user to identify the set of zones from where animal intrusions may be most likely to occur. The user may provide the user input via the user device 106 over the displayed user-selectable recommendation and based on the received user input, the circuitry 202 may select the set of zones to be protected from the animal intrusion.

By way of example, and not limitation, the determined plurality of zones may include a driveway, a garage, a lawn, a porch, and a backyard of a house. The set of zones may include the lawn, the driveway, and the backyard only as the user may not prefer to activate the repellent mechanism 110 to target animal intrusions near the garage, especially when the user's vehicle is parked in front of the garage. This may be because the repellent mechanism 110 (when activated) may apply a smear/smudge on the vehicle or may risk a damage to certain parts, such as seat covers, carpet, or in-vehicle electronics of the vehicle. The selection of the set of zones is described further in detail, for example, in FIG. 4. Once the user-specified setting is stored, the circuitry 202 may transition from the preview mode 302A to the operational mode 302B. Operations from 308 to 314 of the operational mode 302B are described herein.

At 308, an image 308A of the house yard may be acquired in the operational mode 302B. The circuitry 202 may control the image-capture device 104 to acquire the image 308A of the house yard. In some embodiments, a motion sensor may be installed in the house yard along with the image-capture device 104. The motion sensor may detect the motion of an animal in the house yard or in the vicinity of the house yard and may trigger the image-capture device 104 to acquire the image 308A of the house yard. It should be noted that the motion sensor may be able to classify the motion of the animal, humans, vehicles, or other objects based on a pattern associated with motion signals acquired by the motion sensor and may only trigger the image-capture device 104 when the pattern is associated with that of an animal. Thus, the image-capture device 104 may only be triggered based on the detected presence of the animal. Advantageously, this implementation may also reduce power and memory consumption for the image-capture device 104.

At 310, an animal may be detected in the acquired image 308A. The circuitry 202 may detect the animal in the image 308A. The animal may be detected by application of methods which may be known to one skilled ordinarily in the art. By way of example, the circuitry 202 may implement a suitable object detector, which may be trained to classify objects in the image 308A into animal types (i.e. class labels). The object detector may include a trained neural network (such as a trained convolutional neural network (CNN)) to detect the animal and a type of the detected animal in the image 308A.

In some embodiments, the circuitry 202 may also detect the type of the detected animal. The object detector may also localize the detected animal in the image 308A through a bounding box and with a suitable label to denote the detected type of the animal. For example, the detected type of animal may be one of a dog, a coyote, a bear, a raven, a hawk, a hog, a deer, a rabbit, a rat, and the like. In order to detect the type, the circuitry 202 may determine a height of the detected animal and physical features, such as skin color, size, mammalian features (like fur, hair or feathers), horns, and the like. The type of the animal may be detected further based on the determined height and the physical features.

In some embodiments, the circuitry 202 may classify the detected animal as one of a user's pet animal or a stray animal (or a wild animal). By way of example, and not limitation, images or other attributes (such as animal sound) of the user's pet animal may be stored in the memory 204. Once the animal is detected, the circuitry 202 may compare the acquired image 308A or other attributes (such as the animal sound) of the detected animal with the stored images and the other attributes of the user's pet animal. Such classification may enable the circuitry 202 to decide whether to actuate the repellent mechanism 110 or not. Specifically, if the detected animal is determined to be the user's pet animal based on the comparison, then the repellent mechanism 110 may not be actuated, and the detection may be discarded.

At 312, the detected animal's position may be determined. The position of the detected animal may be determined to detect whether the animal is present in any of the selected set of zones. The circuitry 202 may determine the position of the detected animal in the house yard in real time or in near real time. In some embodiments, the circuitry 202 may calculate the distance of the detected animal from the image-capture device 104 (implemented as a stereo camera). Based on the calculated distance, the circuitry 202 may determine the position of the detected animal.

At 314, the repellent mechanism 110 may be controlled. Based on a determination that the detected animal is in one of the selected set of zones, the circuitry 202 may control the repellent mechanism 110 to target the detected animal. For example, in case the determined position of the detected animal is in a zone of the selected set of zones (as per the user's specified setting), the circuitry 202 may activate the repellent mechanism 110 to target the detected animal in the zone. Otherwise, if the determined position lies in a zone which is not selected by the user, the repellent mechanism 110 may remain deactivated and the circuitry 202 may discard the detection of the animal as a potential intrusion in the house yard. If the animal re-enters one of the selected set of zones, the repellent mechanism 110 may be activated to target the animal.

As one example, if the animal is detected as a stray dog, the circuitry 202 may control the water jet to spray the water on the detected animal. In some embodiments, the circuitry 202 may further follow the path of the animal and control the water jet to follow the dog until the dog reaches a threshold distance from the house. As another example, if the animal is detected as a stray hog, the circuitry 202 may use stink bombs to deter the hog as the unpleasant smell of the stink bombs may cause the hog to leave the zone or associated property.

In one embodiment, the circuitry 202 may detect a presence of a child or a known person (e.g., owner or a friend of the owner) in the zone where the animal is detected. In such a scenario, the circuitry 202 may control the repellent mechanism 110 to target the detected animal when the animal moves to a different zone of the selected set of zones. Also, in cases where the child or the known person is detected in a zone (not among the selected set of zones) which is different from a zone (among the selected set of zones) in which the animal is detected, the circuitry 202 may control the repellent mechanism 110 to target the detected animal while avoiding any impact of the repellent mechanism 110 on the child or the known person.

In another embodiment, the circuitry 202 may detect a presence of a valuable or precious object in the zone where the animal is detected. Examples of such a precious or valuable object may include, but are not limited to, a car, a bicycle, patio furniture or a fragile plant. The circuitry 202 may control the repellent mechanism 110 to target the detected animal when the detected animal moves to a different zone of the selected set of zones. In cases where the precious or valuable object is present in a zone different from where the animal is detected, the circuitry 202 may control the repellent mechanism 110 to target the detected animal while avoiding any impact of the repellent mechanism 110 on the precious or valuable object.

It should be noted that the repellent mechanism 110 may include one or more components, such as a sling shot type of apparatus to target the detected animal with a stink bomb, a light source and a driver circuit to control an intensity and a flashing frequency of the flashlight, a water source, a nozzle, and an electronically actuated pump for the water spray or the water jet. Similarly, for a chemical spray, a chemical tank (pressurized or unpressurized). a pump and spray nozzle to control pressure and jet speed or spread may be required. Details of such components are omitted from the disclosure for the sake of brevity.

In some embodiments, the repellent mechanism 110 may be a barricade setup installed in a compacted configuration in the zone, which may be among the selected set of zones in the acquired image 308A. By way of example, and not limitation, in the compacted configuration, the barricade setup may be retracted in a housing below the ground level. The circuitry 202 may set the barricade setup to an uncompacted configuration in the zone based on the detection of the animal in the zone. By way of example and not limitation, in the uncompacted configuration, the barricade setup may extend from the housing to rise above the ground level up to a certain height. In some embodiments, the circuitry 202 may be further configured to adjust the z-height of the set barricade setup based on a height of the detected animal, as determined at 310. An example of such control of the repellent mechanism 110 is described further in detail, for example in FIG. 5.

In some embodiments, the circuitry 202 may select a deterrence strategy of a set of deterrence strategies based on the determined type of the detected animal (as described at 310). The deterrence strategy may be chosen to discourage the animal and prevent the animal from doing any harm to animated or in-animated objects in the house yard. For each type of animal, there may be a corresponding deterrence strategy which may be stored in the memory 204. By way of example, and not limitation, the set of deterrence strategies may include, but are not limited to, a stink bomb attack, a flashing light, playback of alarm sounds or other animal sounds, activation of water spray, or a combination thereof. The circuitry 202 may control the repellent mechanism 110 further based on the selected deterrence strategy to target the detected animal in the zone of the house yard. By way of example, and not limitation, if the detected animal is sensitive to sounds (such as of animals that belong to a predatory species), a deterrence strategy may be to ring a siren or play an animal sound (e.g., a lion's roar) to scare away the animal. By way of another example, and not limitation, if the detected animal is sensitive to water (such as deer, foxes, raccoons, coyotes, rabbits, mink, wild cats, or skunk), a deterrence strategy may be to active a water spray to scare away the animal.

In some embodiments, the circuitry 202 may control the image-capture device 104 to acquire a sequence of images and track a path of the detected animal in the acquired sequence of images. The circuitry 202 may control the repellent mechanism 110 to target the detected animal along the tracked path of the detected animal. For example, if the repellent mechanism 110 includes a water jet with a moveable nozzle and a pressure controller, the circuitry 202 may control the repellent mechanism 110 to follow the animal along the tracked path and strike the animal with a water jet along the tracked path. The pressure controller may adjust the pressure of the water jet along the tracked path.

FIG. 4 is a diagram that depicts an exemplary scenario for selection of a set of zones to be protected from animal intrusions, in accordance with an embodiment of the disclosure. FIG. 4 is explained in conjunction with elements from FIGS. 1, 2, and 3. With reference to FIG. 4, there is shown an exemplary scenario 400. In FIG. 4, there is further shown a preview image 402 of a house yard.

The circuitry 202 may control the image-capture device 104 to acquire the preview image 402 of a FoV region of the image-capture device 104. The circuitry 202 may control the user device 106 to display the acquired preview image 402 and determine a plurality of zones of the house yard in the acquired preview image 402. As shown, the acquired preview image 402 of the house yard contains the front yard, where the plurality of zones includes a lawn 404, a driveway 406, a garage 408, and a porch 410. The circuitry 202 may control the user device 106 to display a plurality of bounding boxes, enclosing or marking a respective region of each zone of the determined plurality of zones in the acquired preview image 402.

In order to allow a user to select zones, the circuitry 202 may control the user device 106 to display a plurality of user-selectable options onto the displayed preview image. As shown, the plurality of user-selectable options includes checkboxes which may be displayed over the determined plurality of zones. Each user-selectable option may correspond to at least one of the determined plurality of zones. For example, a first checkbox 404A may correspond to the lawn 404, a second checkbox 406A may correspond to the driveway 406, a third checkbox 408A may correspond to the garage 408, and a fourth checkbox 410A may correspond to the porch 410.

The circuitry 202 may receive, via the user device 106, a user input over the displayed plurality of user-selectable options and may select, from the determined plurality of zones, the set of zones which are to be protected from the animal intrusion based on the user input. As shown, the user input may be received for the lawn 404 and driveway 406 by a selection the first checkbox 404A and the second checkbox 406A, respectively. The lawn 404 and the driveway 406 may be included in the selected set of zones. The user may decide to not select the garage 408 and the porch 410 as they may contain some valuable objects (e.g., a cars, an art piece, or an electrical equipment) that may be damaged if repellent mechanism 110 (like a chemical repellent or water jet) is activated in the garage 408 or the porch 410. The user selection (includes the lawn 404 and the driveway 406 as the set of zones) may be stored in the memory 204 as a user-specified setting for the electronic apparatus 102.

Figure 5:
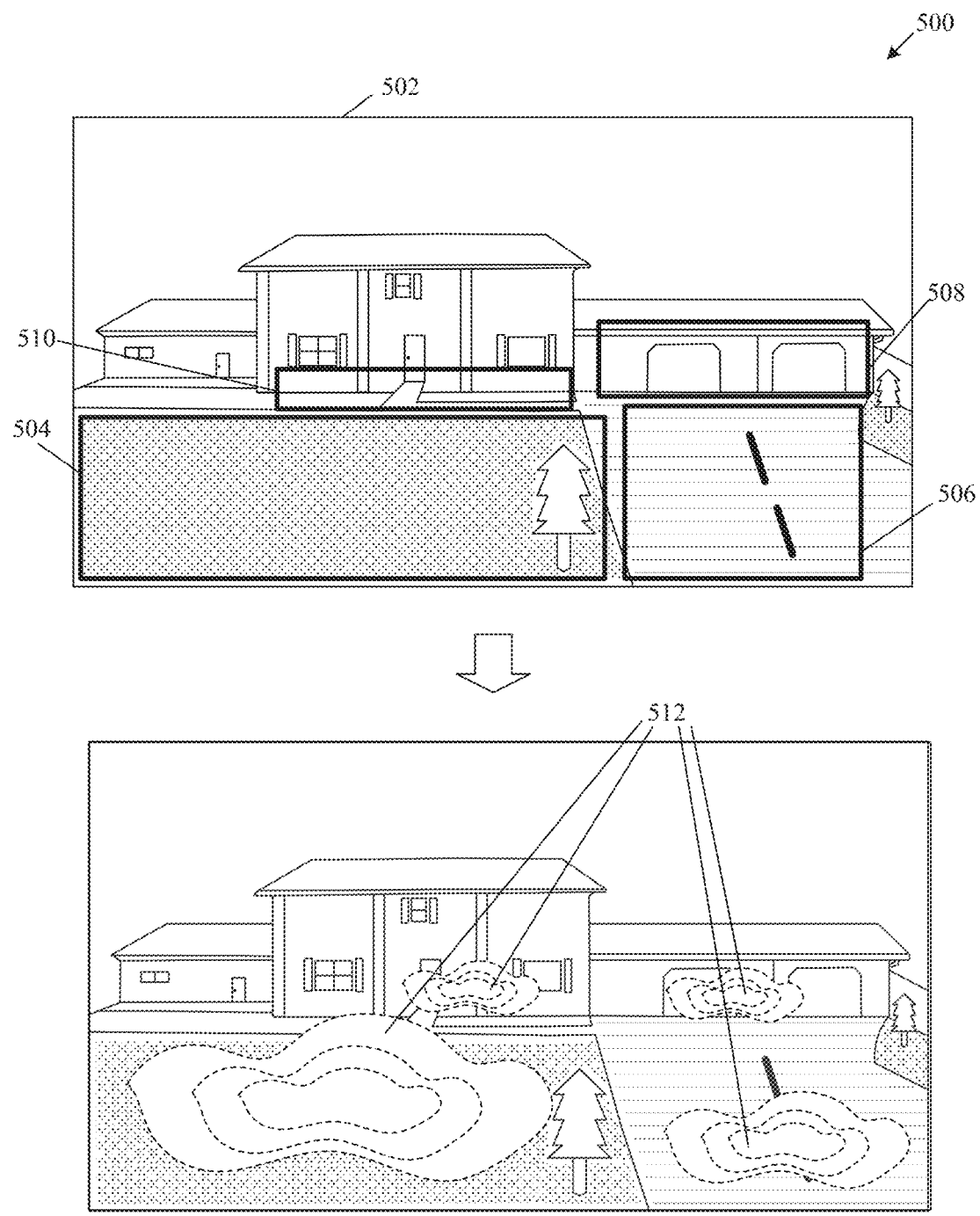
FIG. 5 is a diagram that depicts an exemplary scenario for selection of a set of zones to be protected from animal intrusions, in accordance with an embodiment of the disclosure.

FIG. 5 is a diagram that depicts an exemplary scenario for selection of a set of zones to be protected from animal intrusions, in accordance with an embodiment of the disclosure. FIG. 5 is explained in conjunction with elements from FIGS. 1, 2, and 3. With reference to FIG. 5, there is shown an exemplary scenario 500. In FIG. 5, there is further shown a preview image 502 of a house yard. The circuitry 202 may control the image-capture device 104 to acquire the preview image 502 of a FoV region of the image-capture device 104. The circuitry 202 may control the user device 106 to display the acquired preview image 502 and determine a plurality of zones of the house yard in the acquired preview image 502. As shown, the acquired preview image of 502, the house yard contains the front yard, where the plurality of zones includes a lawn 504, a driveway 506, a garage 508, and a porch 510.

As the user could show a prejudice or a bias in the selection of the zones, support information in the form of heatmap(s) or a recommendation may be provided to the user so that the user makes an informed selection of zones from where animal intrusions may most likely occur. For this, the circuitry 202 may receive a frequency of historical animal intrusions in each zone of the determined plurality of zones from the user device 106 or the server 108. In some embodiments, the frequency of historical animal intrusions in each zone of the determined plurality of zones may be determined based on analysis of animal intrusions in in past few days or months, for example, past 6 months. The circuitry 202 may generate a heatmap 512 of the determined plurality of zones in the acquired preview image 502. The heatmap 512 may indicate a frequency of the historical animal intrusions in each zone of the determined plurality of zones.

The electronic apparatus 102 may control the user device 106 to display a user-selectable recommendation that may include the set of zones to be protected from animal intrusion based on the generated heatmap 512. For example, if the frequency of animal intrusions is greater than or equal to a threshold value for a zone, the portion of the heatmap 512 for the corresponding zone may be rendered in a first color pattern, such as a gradient of red color. If the frequency of the animal intrusions is lower than the threshold value for a zone, the portion of the heatmap 512 for the corresponding zone may be rendered in a second color pattern, such as a gradient of yellow color to differentiate from the first color pattern. As shown, the portion of the heatmap 512 for the lawn 504 and the driveway 506 may be rendered in the first color pattern to indicate the high frequency of the animal intrusions. Similarly, the portion of the heatmap 512 for the garage 508 and the porch 510 may be rendered in the second color pattern to indicate a low frequency of the animal intrusions.

The circuitry 202 may receive a user input over the displayed user-selectable recommendation via the user device 106 and may select the set of zones that may need to be protected from the animal intrusion based on the received user input. As shown, the selected set of zones may include the lawn 504 and the driveway 506 as the frequency of animal intrusions may be more in these areas as compared to other zones (the garage 508 and the porch 510).

Figure 6:
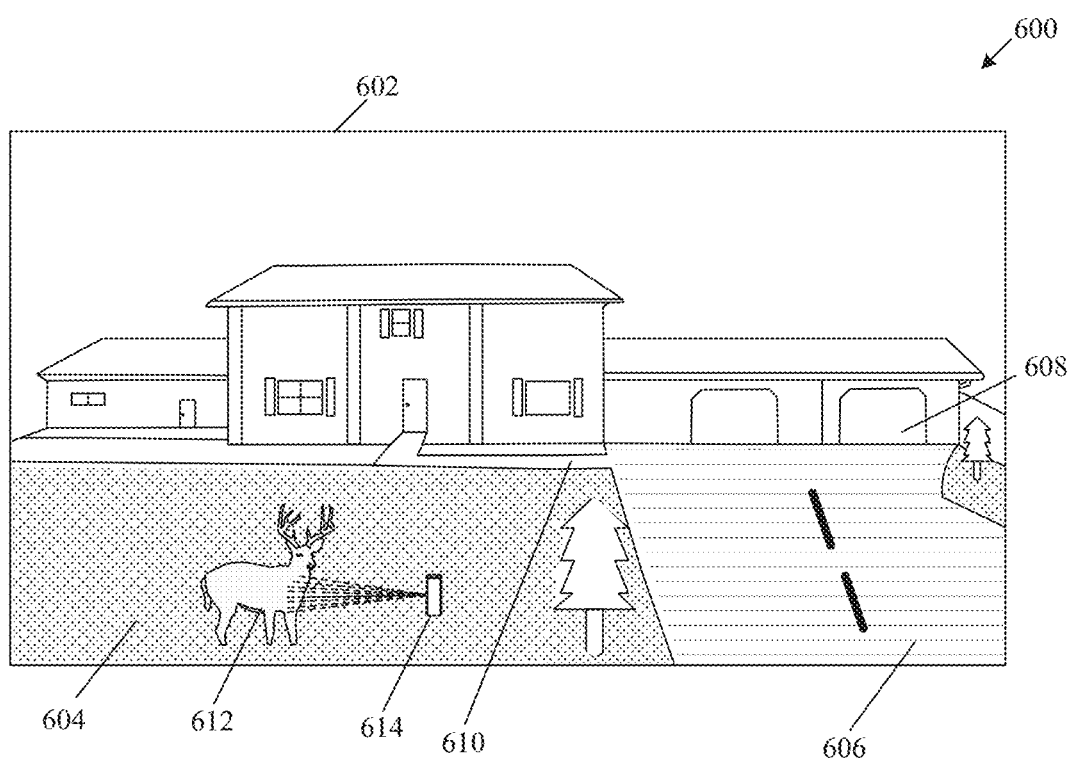
FIG. 6 is diagram that depicts an exemplary scenario for controlling a repellent mechanism on detection of an animal in selected zones of a house yard, in accordance with an embodiment of the disclosure.

FIG. 6 is diagram that depicts an exemplary scenario for controlling a repellent mechanism on detection of an animal in selected zones of a house yard, in accordance with an embodiment of the disclosure. FIG. 6 is explained in conjunction with elements from FIGS. 1, 2, 3, 4, and 5. With reference to FIG. 6, there is shown an exemplary scenario 600. In FIG. 6, there is further shown an image 602 of a house yard that may be acquired by the image-capture device 104. The image 602 may include a front yard, which includes a lawn 604, a driveway 606, a garage 608, and a porch 610. The lawn 604 and the driveway 606 may be included in the selected set of zones based on the user input. The selection of the set of zones is described in detail, for example, in FIGS. 3, 4, and 5.

In some embodiments, the circuitry 202 may detect a presence of an animal 612 in the house yard or in the vicinity of house yard. In at least one embodiment, the circuitry 202 may also determine a type of the detected animal 612 based on physical attributes of the detected animal 612. As shown, the type of the detected animal 612 may be a deer and may be determined to be in a zone which is among the selected set of zones. The position of the deer in the house yard may be determined based on a distance of the image-capture device 104 from the deer. For example, the image-capture device 104 may be a LiDAR sensor and may be able to detect the position of the deer based on a Time-of-Flight (TOF) data (i.e. time taken by a laser pulse to reflect back after striking a target) for the deer.

The circuitry 202 may select a deterrence strategy corresponding to the deer. For example, the deterrence strategy may include activation of a water spray along with (or followed by) an alarm sound. The circuitry 202 may control the repellent mechanism 614 to activate the water spray (or a water jet) the alarm to ensure that the deer leaves the zone (and the property associated with the house yard). In case the selected deterrence strategy fails to affect the detected animal 612 (i.e. the deer in FIG. 6), another deterrence strategy may be selected.

In some embodiments, the circuitry 202 may control the image-capture device 104 to capture acquire a sequence of images of the house yard and track a path of the deer in the sequence of images. The circuitry 202 may control the water jet or the water spray to target the deer along the detected path of the deer until the deer reaches a threshold distance away from the boundary of the zone (or outside the house yard).

Figure 7:
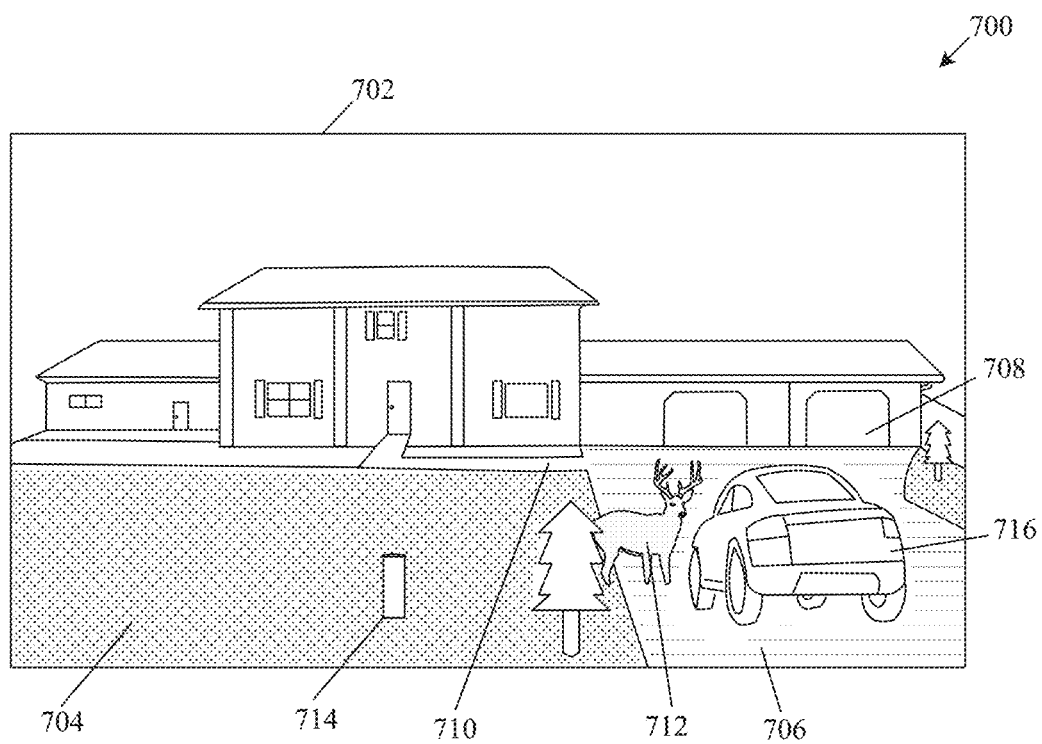
FIG. 7 is a diagram that depicts an exemplary scenario for controlling the repellent mechanism on detection of an animal in a selected zone, in accordance with an embodiment of the disclosure.

FIG. 7 is a diagram that depicts an exemplary scenario for controlling a repellent mechanism on detection of an animal in a selected zone, in accordance with an embodiment of the disclosure. FIG. 7 is explained in conjunction with elements from FIGS. 1, 2, 3, 4, 5, and 6. With reference to FIG. 7, there is shown an exemplary scenario 700. In FIG. 5, there is further shown an image 702 of a front yard that may be acquired by the image-capture device 104. The front yard may include a lawn 704, a driveway 706, a garage 708, and a porch 710. The lawn 704 and the driveway 706 may be selected by the user to protect against animal intrusions and may be included in the selected set of zones. The selection of the set of zones is described in detail, for example, in FIGS. 4 and 5.

The circuitry 202 may detect the zone in which the detected animal 712 may be present. Also, the circuitry 202 may detect a valuable object in the detected zone. As shown, the animal 712 (i.e. a deer) may be detected in the driveway 706 and a car 716 (i.e. a valuable object) may be parked in the driveway 706. Based on the detection of animal 712 and the car 716 in the driveway 706, the circuitry 202 may share a notification with the user device 106 to alert the user about the detection of the animal 712 in the driveway 706. In at least one embodiment, the circuitry 202 may control a repellent mechanism 714 to target the detected animal 712 when the detected animal 712 moves to a different zone, such as the lawn 704.

Figure 8:
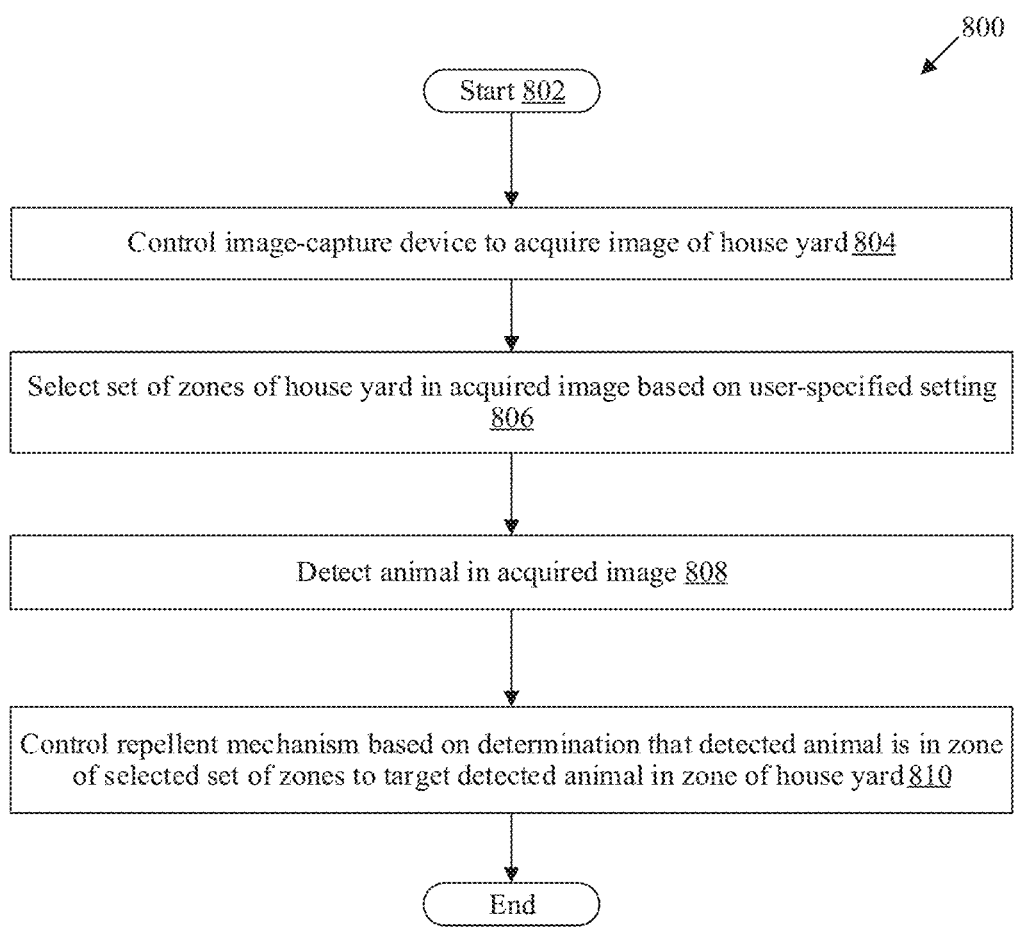
FIG. 8 is a flowchart that illustrates exemplary operations for detection of animal intrusions in a house yard and control of a repellent mechanism for such detected intrusions, in accordance with an embodiment of the disclosure.

FIG. 8 is a flowchart that illustrates exemplary operations for detection of animal intrusions in a house yard and control of a repellent mechanism for such detected intrusions, in accordance with an embodiment of the disclosure. FIG. 8 is explained in conjunction with elements from FIGS. 1, 2, 3, 4, 5, 6, and 7. With reference to FIG. 8, there is shown a flowchart 800. The operations from 802 to 810 may be implemented on any computing system, for example, on the electronic apparatus 102. The operations may start at 802 and proceed to 804.

At 804, an image-capture device 104 may be controlled to acquire an image of a house yard. In at least one embodiment, the circuitry 202 may be configured to control the image-capture device 104 to acquire the image.

At 806, a set of zones of house yard may be selected in acquired image. The set of zones of the house yard may be selected based on a user-specified setting which includes a historical user selection of a set of zones to be protected from an animal intrusion. In at least one embodiment, the circuitry 202 may be configured to select the set of zones of the house yard in the acquired image based on the user-specified setting.

At 808, an animal may be detected in the acquired image. In at least one embodiment, the circuitry 202 may be configured to detect the animal in the acquired image.

At 810, the repellent mechanism 110 may be controlled to target the detected animal in the selected set of zones of the house yard. The repellent mechanism 110 may be controlled based on a determination that the detected animal is in a zone of the selected set of zones. In at least one embodiment, the circuitry 202 may be configured to control the repellent mechanism 110 based on the determination that the detected animal is in the zone of the selected set of zones to target the detected animal in the zone of the house yard. Control may pass to end.

Various embodiments of the disclosure may provide a non-transitory computer readable medium and/or storage medium having stored thereon, instructions executable by a machine and/or a computer to operate an electronic apparatus. The instructions may cause the machine and/or computer to perform operations that include controlling an image-capture device to acquire an image which includes a house yard. The operations may further include selecting a set of zones of the house yard in the acquired image based on a user-specified setting. The user-specified setting may include a historical user selection of the set of zones to be protected from an animal intrusion. The operations may further include detecting an animal in the acquired image and controlling a repellent mechanism, based on a determination that the detected animal is in a zone of the selected set of zones, to target the detected animal in the zone of the house yard.

Exemplary aspects of the disclosure may include an electronic apparatus (such as the electronic apparatus 102 of FIG. 1) that includes circuitry (such as the circuitry 202) and a repellent mechanism (such as the repellent mechanism 110). The circuitry may be configured to control the image-capture device (such as the image-capture device 104) to acquire a preview image of a Field-of-View (FoV) region of the image-capture device. The circuitry may be further configured to control a user device (such as the user device 106) to display the acquired preview image. The circuitry may be further configured to determine a plurality of zones of the house yard in the acquire preview image.

In some embodiments, the circuitry may be configured to generate a heatmap (such as the generated heatmap 512 of the determined plurality of zones in the acquired preview image. The heatmap may indicate a frequency of historical animal intrusions in each zone of the determined plurality of zones. The circuitry may be further configured to control the user device to display a user-selectable recommendation. The user-selectable recommendation may include the set of zones to be protected from the animal intrusion based on the generated heatmap. The circuitry may be further configured to receive a user input via the user device over the displayed user-selectable recommendation and select the set of zones from the determined plurality of zones that may need be protected from the animal intrusion based on the received user input. The circuitry may be further configured to store the selection of the set of zones as the user-specified setting on the electronic apparatus.

In some other embodiments, the circuitry may be configured to control the user device to display a plurality of user-selectable options onto the displayed preview image. The circuitry may be further configured to receive a user input over the displayed plurality of user-selectable options via the user device. The circuitry may be further configured to select the set of zones from the determined plurality of zones that may need to be protected from the animal intrusion based on the user input. The circuitry may be further configured to store the selection of the set of zones as the user-specified setting on the electronic apparatus.

In accordance with an embodiment, the circuitry may be configured to control the image-capture device to acquire an image (such as the image 308A) of a house yard. In an embodiment, the circuitry may be configured to detect a presence of the animal in the house yard or in vicinity of the house yard. The presence of the animal in the house yard or in vicinity of the house yard may be detected via a motion sensor. The motion sensor may be installed in the house yard. The circuitry may be further configured to control the image-capture device to acquire the image of the house yard based on the detected presence of the animal.

In some embodiments, the circuitry may be configured to detect an animal (such as the detected animal 612) in the acquired image. In an embodiment, the circuitry may be further configured to share a notification with a user device based on the detection of the animal in the acquired image. The notification may include the acquired image and a prompt that requests a user action on the animal intrusion.

In another embodiment, the circuitry may be further configured to determine a height and a type of the detected animal. In another embodiment, the circuitry may be further configured to classify the detected animal as one of: a user's pet animal or a stray animal. In some other embodiment, the circuitry may be further configured to determine the zone house yard in which the detected animal is present. The circuitry may be further configured to detect a presence of a valuable object (such as the car 716), a child or a known person in the zone where the animal is present.

In accordance with the embodiment, the circuitry may be further configured to control the repellent mechanism to target the detected animal in the zone of the house yard. In case the presence of the valuable object, the child or the known person in the zone where the presence of the animal is detected, the circuitry may be configured to control the repellent mechanism to target the detected animal when the animal moves to a different zone of the selected set of zones. In another embodiment, the circuitry may be configured to control the repellent mechanism based on a determination that the detected animal is classified to be the stray animal. In some other embodiments, the circuitry may be configured to select a deterrence strategy of a set of deterrence strategies stored on the electronic apparatus based on the determined type of the detected animal and control the repellent mechanism further based on the selected deterrence strategy.

In accordance with an embodiment, the circuitry may be further configured to control the image-capture device to acquire a sequence of images and track a path of the detected animal in a sequence of images. The circuitry may be further configured to control the repellent mechanism to target the detected animal along the tracked path of the detected animal.

The repellent mechanism may include, but not limited to, one or more of: a water spray, a water jet, an alarm, a stink bomb, a chemical repellent spray, or a flashlight. In some embodiments, the repellent mechanism may be a barricade setup installed in a compacted configuration. The circuitry may be configured to set the barricade setup to an uncompacted configuration in the zone and adjust a z-height of the set barricade setup based on the determined height of the detected animal.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
   circuitry communicatively coupled to a repellent mechanism, wherein the circuitry is configured to:
   control an image-capture device to acquire an image of a house yard;
   select a set of zones in the acquired image based on a user-specified setting;
   detect, in the acquired image, an animal in a first zone of the set of zones;
   detect a presence of a child or a known person in the first zone where the animal is detected; and
   control the repellent mechanism to target the detected animal in a case where the detected animal moves to a second zone of the selected set of zones, wherein the first zone is different from the second zone.

2. The electronic apparatus according to claim 1, wherein the circuitry is further configured to:
   control the image-capture device to acquire a preview image of a Field-of-View (FoV) region of the image-capture device;
   control a user device to display the acquired preview image; and
   determine a plurality of zones in the acquired preview image.

3. The electronic apparatus according to claim 2, wherein the circuitry is further configured to:
   generate a heatmap of the determined plurality of zones in the acquired preview image, wherein the heatmap indicates a frequency of historical animal intrusions in each zone of the determined plurality of zones;
   control the user device to display a user-selectable recommendation comprising the set of zones to be protected from an animal intrusion based on the generated heatmap;
   receive a user input via the user device over the displayed user-selectable recommendation;
   select, from the determined plurality of zones, the set of zones which are to be protected from the animal intrusion based on the received user input; and
   store the selection of the set of zones as the user-specified setting on the electronic apparatus.

4. The electronic apparatus according to claim 2, wherein the circuitry is further configured to:
   control the user device to display a plurality of user-selectable options onto the displayed preview image;
   receive, via the user device, a user input over the displayed plurality of user-selectable options;
   select, from the determined plurality of zones, the set of zones which are to be protected from an animal intrusion based on the user input; and
   store the selection of the set of zones as the user-specified setting on the electronic apparatus.

5. The electronic apparatus according to claim 1, wherein the circuitry is further configured to:
   detect, via a sensor installed in the house yard, a presence of the animal in the house yard or in vicinity of the house yard; and
   control, based on the detected presence of the animal, the image-capture device to acquire the image of the house yard.

6. The electronic apparatus according to claim 1, wherein the circuitry is further configured to share a notification with a user device based on the detection of the animal in the acquired image, and
   the notification comprises the acquired image and a prompt that requests a user action on an animal intrusion.

7. The electronic apparatus according to claim 1, wherein the repellent mechanism comprises one or more of: a water spray, a water jet, a sound alarm, a stink bomb, a chemical repellent spray, or a light flash.

8. The electronic apparatus according to claim 1, wherein the repellent mechanism is a barricade setup installed in a compacted configuration, and
   the circuitry is further configured to:
   set the barricade setup to an uncompacted configuration in the first zone; and
   adjust a z-height of the set barricade setup based on a height of the detected animal.

9. The electronic apparatus according to claim 1, wherein the circuitry is further configured to:
   classify the detected animal as one of a user's pet animal or a stray animal; and
   control the repellent mechanism further based on a determination that the detected animal is classified to be the stray animal, to target the detected animal.

10. The electronic apparatus according to claim 1, wherein the circuitry is further configured to:
    determine a type of the detected animal; and
    select a deterrence strategy of a set of deterrence strategies stored on the electronic apparatus based on the determined type of the detected animal; and
    control the repellent mechanism further based on the selected deterrence strategy, to target the detected animal.

11. The electronic apparatus according to claim 1, wherein the circuitry is further configured to:
    control the image-capture device to acquire a sequence of images;
    track a path of the detected animal in a sequence of images; and
    control the repellent mechanism to target the detected animal along the tracked path of the detected animal.

12. The electronic apparatus according to claim 1, wherein the circuitry is further configured to:
    detect a valuable object in the first zone where the animal is detected; and
    control the repellent mechanism to target the detected animal when the animal moves to the second zone of the selected set of zones.

13. A method, comprising:
    in an electronic apparatus:
    controlling an image-capture device to acquire an image of a house yard;
    selecting a set of zones in the acquired image based on a user-specified setting;
    detecting, the acquired image, an animal in a first zone of the set of zones;
    detecting a presence of a child or a known person in the first zone where the animal is detected; and
    controlling a repellent mechanism to target the detected animal in a case where the detected animal moves to a second zone of the selected set of zones.

14. The method according to claim 13, further comprising:
controlling the image-capture device to acquire a preview image of a Field-of-View (FoV) region of the image-capture device;
controlling a user device to display the acquired preview image; and
determining a plurality of zones of the house yard in the acquired preview image.

15. The method according to claim 14, further comprising:
controlling the user device to display a plurality of user-selectable options onto the displayed preview image;
receiving, via the user device, a user input over the displayed plurality of user-selectable options;
selecting, from the determined plurality of zones, the set of zones which are to be protected from an animal intrusion based on the user input; and
storing the selection of the set of zones as the user-specified setting on the electronic apparatus.

16. The method according to claim 13, further comprising:
classifying the detected animal as one of: a user's pet animal or a stray animal; and
controlling the repellent mechanism further based on a determination that the detected animal is classified to be the stray animal, to target the detected animal.

17. The method according to claim 13, further comprising:
controlling the image-capture device to acquire a sequence of images;
tracking a path of the detected animal in a sequence of images; and
controlling the repellent mechanism to target the detected animal along the tracked path of the detected animal.

18. An electronic apparatus, comprising:
circuitry configured to:
control an image-capture device to acquire a preview image of a Field-of-View (FoV) region of the image-capture device;
determine a plurality of zones in a house yard in the acquired preview image;
control a user device to display the acquired preview image;
control the user device to display a plurality of user-selectable options onto the displayed preview image;
receive, via the user device, a user input over the displayed plurality of user-selectable options;
select, from the determined plurality of zones, a set of zones which is to be protected from an animal intrusion based on the user input;
store the selection of the set of zones as a user-specified setting on the electronic apparatus;
control the image-capture device to acquire an image of the house yard;
detect, in the acquired image of the house yard, an animal in a first zone of the set of zones;
detect a presence of a child or a known person in the first zone where the animal is detected; and
control a repellent mechanism to target the detected animal in a case where the detected animal moves to a second zone of the set of zones.

19. An electronic apparatus, comprising:
circuitry communicatively coupled to a repellent mechanism, wherein the circuitry is configured to:
control an image-capture device to acquire a preview image of a Field-of-View (FoV) region of the image-capture device;
control a user device to display the acquired preview image;
determine a plurality of zones in the acquired preview image;
generate a heatmap of the determined plurality of zones in the acquired preview image, wherein the heatmap indicates a frequency of historical animal intrusions in each zone of the determined plurality of zones;
control, based on the generated heatmap, the user device to display a user-selectable recommendation comprising a set of zones of the determined plurality of zones to be protected from an animal intrusion;
receive a user input via the user device over the displayed user-selectable recommendation;
select, from the determined plurality of zones, the set of zones which are to be protected from the animal intrusion based on the received user input;
store the selection of the set of zones as a user-specified setting on the electronic apparatus;
control the image-capture device to acquire an image of a house yard;
select, based on the user-specified setting, the set of zones in the acquired image of the house yard;
detect an animal in the acquired image of the house yard; and
control the repellent mechanism based on a determination that the detected animal is in a zone which is among the selected set of zones, to target the detected animal.

20. An electronic apparatus, comprising:
circuitry communicatively coupled to a repellent mechanism, wherein the circuitry is configured to:
control an image-capture device to acquire an image of a house yard;
select a set of zones in the acquired image based on a user-specified setting;
detect an animal in the acquired image;
control the repellent mechanism based on a determination that the detected animal is in a zone which is among the selected set of zones, to target the detected animal, wherein the repellent mechanism is a barricade setup installed in a compacted configuration;
set the barricade setup to an uncompacted configuration in the zone; and
adjust a z-height of the set barricade setup based on a height of the detected animal.

21. An electronic apparatus, comprising:
circuitry communicatively coupled to a repellent mechanism, wherein the circuitry is configured to:
control an image-capture device to acquire an image of a house yard;
select a set of zones in the acquired image based on a user-specified setting;
detect, in the acquired image, an animal in a first zone of the set of zones;
detect a valuable object in the first zone where the animal is detected; and
control the repellent mechanism to target the detected animal in a case where the detected animal moves to a second zone of the selected set of zones, wherein the first zone is different from the second zone.

* * * * *